United States Patent
Okawa

(10) Patent No.: US 6,927,520 B2
(45) Date of Patent: Aug. 9, 2005

(54) ROTARY ELECTRIC MACHINE HAVING STATOR ROTATION-RESTRICTING BOLT

(75) Inventor: Goroku Okawa, Chiryu (JP)

(73) Assignee: Denso Corporation, Kariya (JP)

( * ) Notice: Subject to any disclaimer, the term of this patent is extended or adjusted under 35 U.S.C. 154(b) by 206 days.

(21) Appl. No.: 09/939,640

(22) Filed: Aug. 28, 2001

(65) Prior Publication Data

US 2002/0047476 A1 Apr. 25, 2002

(30) Foreign Application Priority Data

Aug. 29, 2000 (JP) .................................. 2000-258896

(51) Int. Cl.$^7$ ............................ H02K 5/00; H02K 5/24; H02K 1/18
(52) U.S. Cl. ......................................... 310/217; 310/89
(58) Field of Search .............................. 310/217, 254, 310/91, 89, 179, 64

(56) References Cited

U.S. PATENT DOCUMENTS

| | | | | |
|---|---|---|---|---|
| 3,539,851 A | * | 11/1970 | Bozvai | .................... 310/64 |
| 3,699,366 A | * | 10/1972 | Wood | .......................... 310/50 |
| 5,696,415 A | * | 12/1997 | Fujimoto et al. | .............. 310/64 |
| 5,936,320 A | * | 8/1999 | Takeda et al. | ................. 310/89 |
| 6,282,053 B1 | * | 8/2001 | MacLeod et al. | ......... 360/98.07 |
| 6,337,530 B1 | * | 1/2002 | Nakamura et al. | .......... 310/258 |

FOREIGN PATENT DOCUMENTS

| JP | 5-15647 | 2/1993 |
|---|---|---|
| JP | 9-172747 | 6/1997 |

* cited by examiner

Primary Examiner—Karl Tamai
(74) Attorney, Agent, or Firm—Oliff & Berridge, PLC

(57) ABSTRACT

A stator core is fixed to a housing by pressing an axial end portion thereof in an axial direction by a flange or a washer of a bolt. An intermediate member, which is softer than the flange or the washer of the bolt, is provided at a contact portion between the flange or the washer and the axial end portion of the stator core. The stator core may have a cavity to directly receive the flange or washer of the bolt in place of the intermediate member.

25 Claims, 3 Drawing Sheets

ROTARY ELECTRIC MACHINE HAVING STATOR ROTATION-RESTRICTING BOLT

CROSS-REFERENCE TO RELATED APPLICATION

This application is based upon and claims the benefit of Japanese Patent Application No. 2000-258896 filed on Aug. 29, 2000, the contents of which are incorporated herein by reference.

BACKGROUND OF THE INVENTION

The present invention relates to a rotary electric machine, such as an electric power generator and an electric motor, fixing a stator core therein.

In rotary electric machines, a stator core fixed to a housing turns by a rotating force generated by a rotor. Therefore, it is necessary to tightly fix the stator core not to turn in the housing as proposed in JP-A-9-172747 and JP-U-5-15647.

JP-A-9-172747 uses bolts having a tapered engaging portion. The bolts are threaded into grooves provided on an outer periphery of the stator core in an axial direction. The tapered engaging portion of the bolt is fit in the groove, and an axial force generated by fastening the bolt is decreased. Therefore, the stator core is not tightly fixed in an axial direction. Moreover, electric power is decreased due to magnetic resistance caused by the grooves of the stator core.

JP-U-5-15647 uses a taper pin. High quality is required to the taper pin, and it is difficult to fit the taper pin accurately. When the taper pin is fit in grooves provided on an outer periphery of a stator core, the stator core is likely to be remarkably deformed so that the electric power is decreased or magnetic noise occurs. Further, once the taper pin is fit, it is difficult to remove the taper pin and repair is difficult.

It is also proposed to fix a stator core to a housing by threading bolts into bolt holes formed in the housing in the axial direction.

SUMMARY OF THE INVENTION

It is an object of the present invention to tightly fix a stator core for restricting turning caused by a rotating force generated by a rotor.

It is another object of the present invention to restrict electric power loss due to an increase in magnetic resistance and an increase in magnetic noise due to deformation of the stator core.

According to one aspect of the present invention, an intermediate member, which is softer than a bolt, is provided at one axial end portion of a stator core. A flange or a washer of the bolt readily cuts into the intermediate member by an axial force generated when fastening the bolt. Therefore, the intermediate member works as a detent so that the stator core is tightly fixed to a housing. Thus, it is not necessary to provide a groove on the stator core and hence an electric power loss due to magnetic resistance is minimized. Moreover, since the intermediate member is deformed instead of the stator core, the magnetic noise due to the deformation of the stator core is suppressed. Further, the stator core is tightly fixed to the housing not to turn by only fastening the bolt into the housing. Thus, mounting-workability is improved. Further, the stator core is detachable from the housing by only removing the bolt so that it is easy to repair components.

According to another aspect of the present invention, a cavity is provided at an axial end portion of a stator core to receive a head of a bolt therein so that the stator core is tightly fixed to the housing and the stator core is restricted from turning. Cut portions of the stator core are fewer so that the electric power loss due to increased magnetic resistance is minimized. Further, the stator core is not deformed so that the magnetic noise due to the deformation of the stator core is minimized.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF PREFERRED EMBODIMENTS

[First Embodiment]

Figure 1:
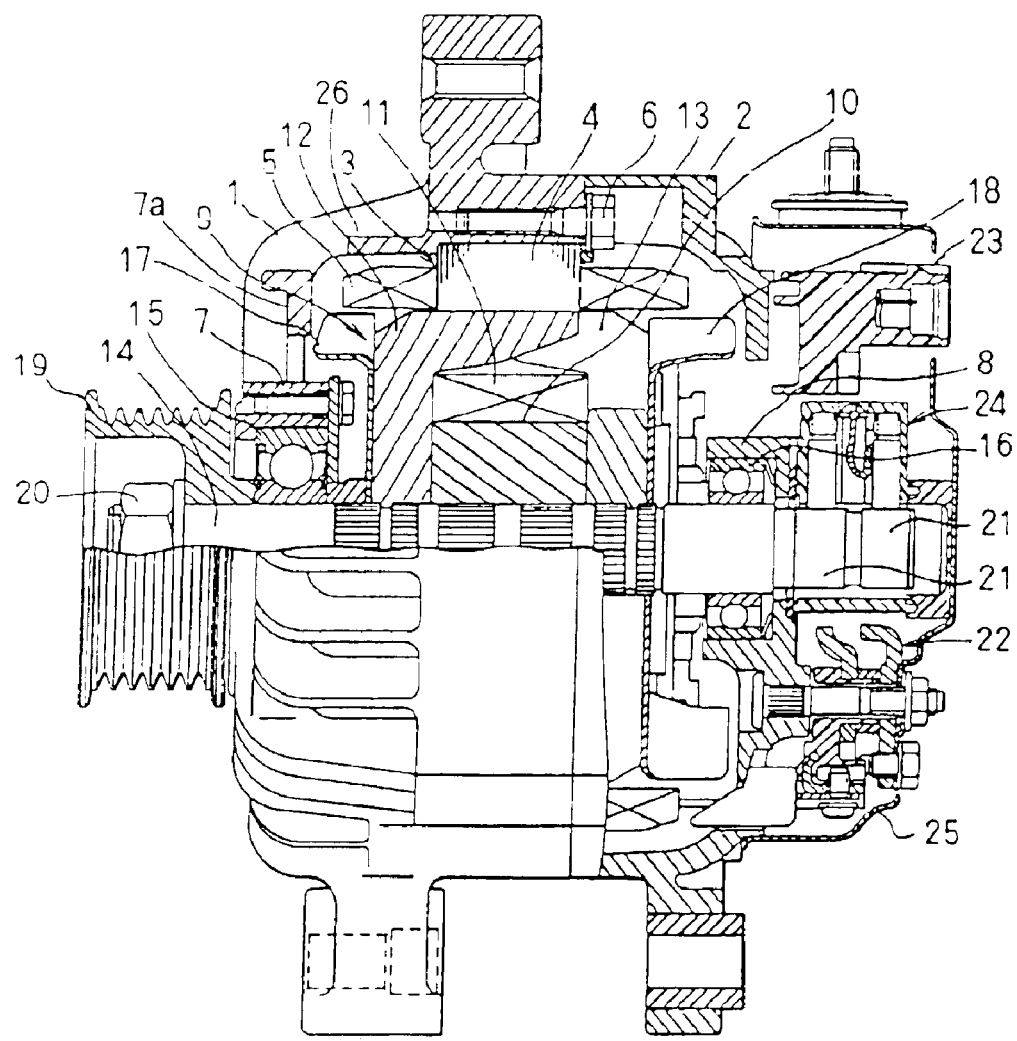
FIG. 1 is a cross-sectional view of an a. c. generator for a vehicle according to a first embodiment of the present invention.

Referring to FIG. 1 showing an a.c. generator for a vehicle, a front housing 1 and a rear housing 2 are formed into a cup shape by aluminum die-casting. The front housing 1 and the rear housing 2 are fixed to each other by press-contacting openings thereof. A stator 3 is composed of a generally cylindrical stator core 4 made of iron sheets and stator coils 5. The stator core 4 is fixed to the front housing 1 with a metal bolt 6. Bearing boxes 7 and 8 are respectively integrated in the front housing 1 and the rear housing 2. Bearing box 7 includes a support rib 7a extending in a radial direct to connect the bearing box 7 to a cylindrical portion 1a of the housing 1 where the stator core 4 is disposed. The cylindrical portion 1a has a thick portion 26 having a radial thickness that is thicker than another portion of the cylindrical portion 1a.

A rotor 9 includes a coil bobbin 10, an excitation coil 11, pole cores 12, 13, a rotor shaft 14 and the like. The rotor 9 is rotatably held by a pair of bearings 15, 16 respectively fixed in the bearing boxes 7, 8. Centrifugal cooling fans 17, 18 are provided on axial end surfaces of the pole cores 12, 13, respectively. A pulley 19 is connected to one axial end of the rotor shaft 14 with a nut 20 to be driven by a vehicle engine (not shown). A pair of slip rings 21 is disposed at the other axial end side of the rotor shaft 14, which is located outside the rear housing 2, to electrically connect to the excitation coil 11.

Electrical components, such as a commutating device 22, a voltage regulator 23 and a brush device 24, are fixed by a bolt and the like at an end surface outside the rear housing 2 in the axial direction. The electrical components are covered with a rear cover 25.

Figure 2:
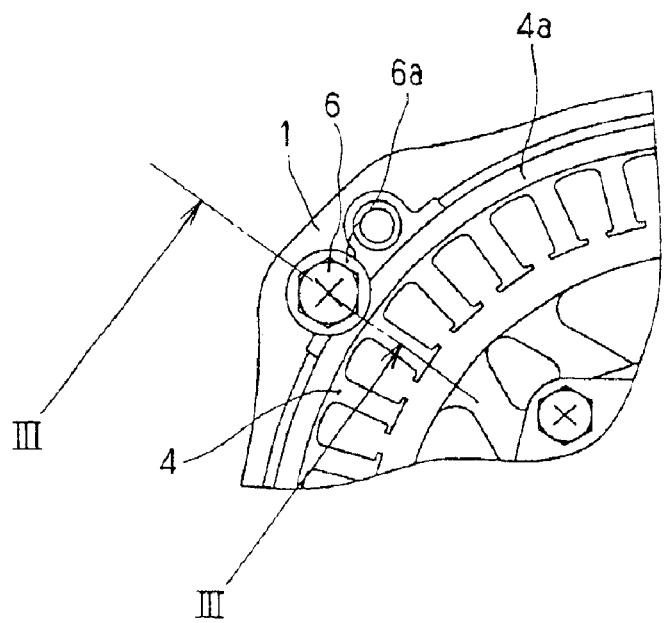
FIG. 2 is an enlarged side view of the a.c. generator shown in FIG. 1.
Figure 3:
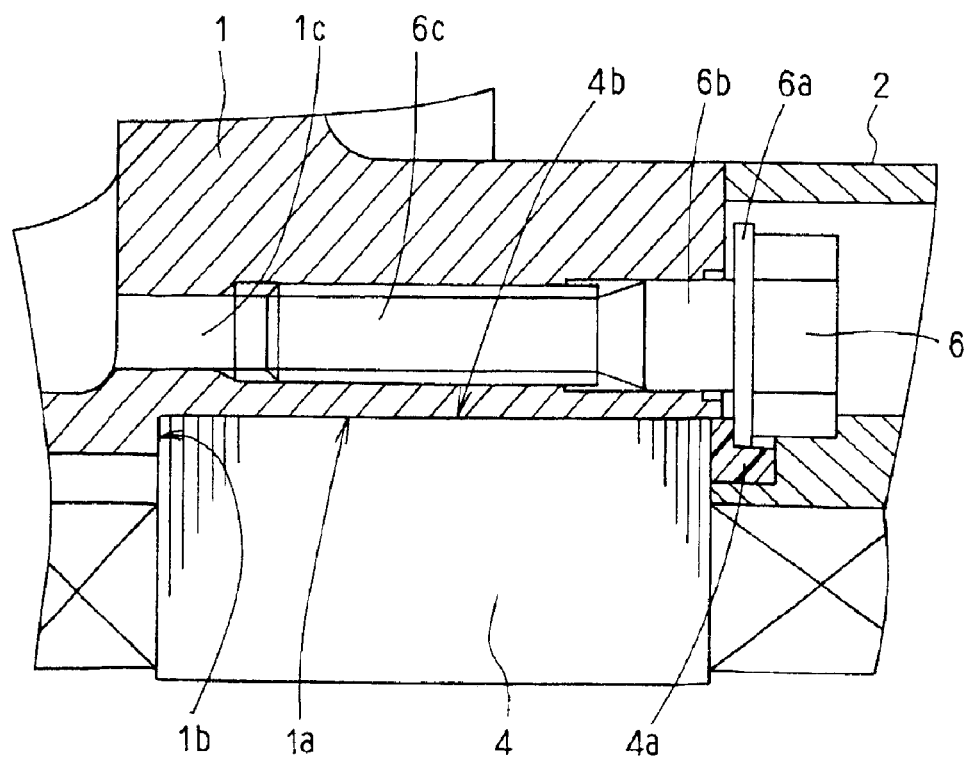
FIG. 3 is an enlarged cross-sectional view of the a.c. generator taken along line III—III in FIG. 2.
Figure 4:
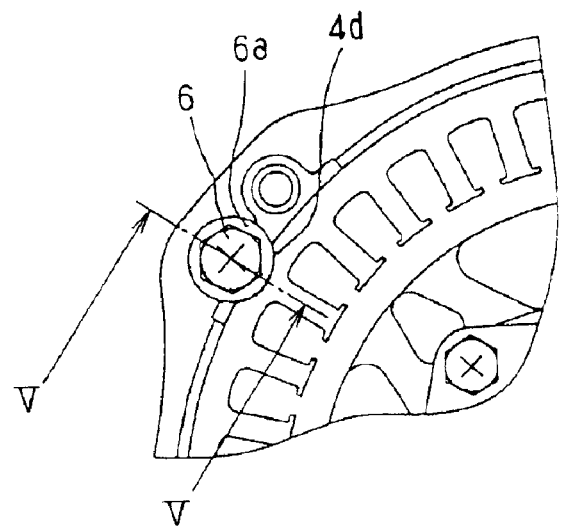
FIG. 4 is an enlarged side view of an a.c. generator according to a second embodiment of the present invention.
Figure 5:
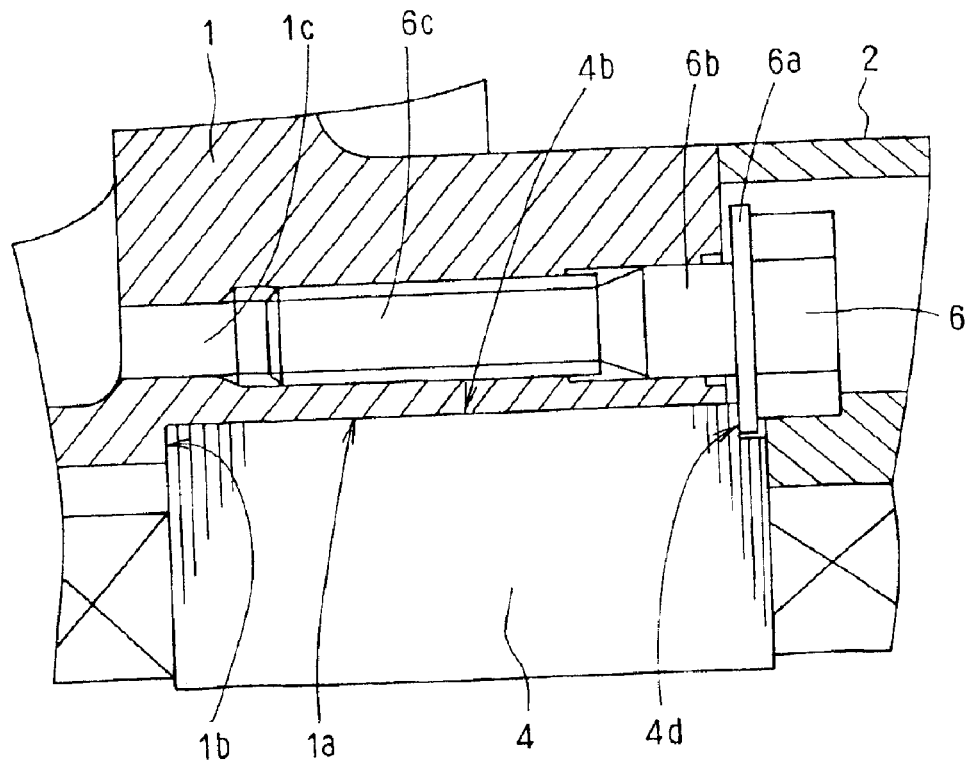
FIG. 5 is an enlarged cross-sectional view of the a.c. generator taken along line V—V in FIG. 4.

As shown in FIGS. 2 and 3, the bolt 6 is composed of a flange 6a, a cylindrical body 6b and a screw 6c. An intermediate member 4a, which is softer than the bolt 6, is bonded or welded to the radially outermost axial end part of the stator core 4. An outer cylindrical peripheral surface 4b of the stator core 4 is fit to an inner cylindrical peripheral surface 1a of the front housing 1. At an inner end of the inner peripheral surface 1a of the front housing 1, a step 1b is provided to receive the radially outermost axial end part of the stator core 4. The housing 1 has a bolt hole 1c extending in the axial direction at a position inside the surface 1a. The flange 6a is a ring-shaped flange having a larger diameter than that of the body 6b. The flange 6a presses the stator core 4 inward by an axial force generated by fastening the bolt 6 into the bolt hole 1c in such a manner that the stator core 4 is sandwiched between the flange 6a and the step 1b. That is, the bolt flange 6a is pressed to the axial end surface of the front housing 1 by the axial force generated when the bolt 6 is tightened through the screw 6c. The body 6b has a larger diameter than that of the screw 6c so that the bolt 6 is tightly fastened without inclining.

Further, the flange 6a cuts into the intermediate member 4a by the axial force so that the intermediate member 4a is deformed at a contact portion with the flange 6a. Therefore, the soft member 4a operates as a detent or a stopper and the stator core 4 is restricted from turning in a circumferential direction when the rotor 9 rotates.

In the first embodiment, a washer bolt having a washer may be used in place of the bolt 6 having the flange 6a, since the washer works similarly to the flange 6a. Alternative to the flange 6a or the washer, the head of the bolt 6 may be enlarged in diameter. The member 4a may have any shapes which can be fixed to the stator core 4 along the outer periphery and be deformed by the bolt 6. It may be in a crescent shape or in a similar shape as the stator core 4.

The bolt 6 may be used at a plurality of locations on a circular periphery having a slightly larger diameter than that of the outer periphery 4b of the stator core 4, at substantially equal angular intervals, in order to tightly fix the stator core 4 and the front housing 1.

According to the first embodiment, the stator 3 is readily installed in the front housing 1 by fixing the stator core 4 with the bolt 6. Moreover, the stator 3 is readily detachable from the front housing 1 by only removing the bolt 6. Therefore, it is easy to repair components.

[Second Embodiment]

In a second embodiment, a cavity or recess 4d is provided at a radially outermost axial end portion of the stator core 4 so that the flange 6a of the bolt 6 is received therein and directly presses the stator core 4 in the axial direction. The cavity 4d works as a detent to restrict the stator core 4 from turning when the rotor 9 rotates.

In the second embodiment, the cavity 4d is formed into a semicircular shape to match the flange 6a of the bolt 6. However, the cavity 4d may have any shapes to work as a detent, such as a triangle. Moreover, similar to the first embodiment, a plurality of bolts may be used on a circular periphery having a slightly larger diameter than that of the outer periphery of the stator core 4, at substantially equal angular intervals, in order to tightly fix the stator core 4 and the front housing 1.

The present invention should not be limited to the disclosed embodiments, but may be implemented in other ways without depending from the spirit of the invention.

What is claimed is:

1. A rotary electric machine, comprising:
   a housing;
   a stator core disposed in the housing;
   a bolt having an enlarged diameter part for fixing the stator core to the housing by pressing one axial end portion of the stator core by the enlarged diameter part; and
   an intermediate member provided at a contact portion between the enlarged diameter part of the bolt and the axial end portion of the stator core, the intermediate member being softer than the enlarged diameter part of the bolt, wherein the intermediate member is deformed at a contact portion with the enlarged diameter part by being pressed with the bolt in the axial direction and the intermediate member is deformed in a depressed manner by reducing an axial height of the intermediate member at the contact portion and keeping an axial height at a portion other than the contact portion.

2. The rotary electric machine as in claim 1, wherein the stator core is fixed to the housing at a plurality of locations spaced apart at equal angular intervals on a periphery which has a slightly larger diameter than that of an outer periphery of the stator core, the bolt being provided at each of the locations.

3. The rotary electric machine as in claim 1, wherein a step is provided at an inner peripheral portion of the housing to receive another axial end portion of the stator core, and the stator core is sandwiched between the step and the enlarged diameter part through the intermediate member.

4. The rotary electric machine as in claim 1, wherein
   the housing has a cylindrical portion accommodating the stator core,
   the cylindrical portion has a bolt hole receiving the bolt and an axial end from which the bolt is inserted into the bolt hole,
   the intermediate member is only provided on the axial end portion of the stator core,
   the axial end portion of the stator core is lower than the axial end of the housing with respect to the axial direction, and
   the intermediate member protrudes beyond the axial end of the housing with respect to the axial direction.

5. The rotary electric machine as in claim 4, wherein the housing comprises:
   a cylindrical portion accommodating the stator core;
   a bearing box in which a bearing is supported;
   a radial support rib extending in a radial direction to connect the bearing box and the cylindrical portion; and
   a bolt hole for receiving the bolt formed on a portion of the housing where the radial support rib is connected.

6. A rotary electric machine, comprising:
   a housing;
   a stator core disposed in the housing; and
   a bolt having an enlarged diameter part for fixing the stator core to the housing by pressing one axial end portion of the stator core by the enlarged diameter part, wherein the stator core has a cavity only at a radially outermost axial end portion of the stator core, and the enlarged diameter part contacts the stator core in the cavity and the bolt is disposed on the housing located radially outside of the stator core.

7. The rotary electric machine as in claim 6, wherein the stator core is fixed to the housing at a plurality of locations spaced apart at equal angular intervals on a periphery which has a slightly larger diameter than that of an outer periphery of the stator core, the bolt being provided at each of the locations.

8. The rotary electric machine according to claim 7, wherein an axis of each bolt is located radially outside of an outermost circumference of the stator core.

9. The rotary electric machine as in claim 6, wherein a step is provided at an inner peripheral portion of the housing to receive another axial end portion of the stator core, and the stator core is sandwiched between the step and the enlarged diameter part.

10. The rotary electric machine as in claim 6, wherein the housing comprises:
   a cylindrical portion accommodating the stator core; and
   a bolt hole for receiving the bolt formed on the cylindrical portion of the housing, the bolt hole having a threaded portion that is shorter than an axial length of the stator core and is located within a radial outside area of the stator core.

11. The rotary electric machine according to claim 10, wherein an axis of each bolt is located radially outside of an outermost circumference of the stator core.

12. The rotary electric machine according to claim 6, wherein the cavity is formed on only one axial end face of the stator core to open in an axial direction.

13. The rotary electric machine according to claim 12, wherein the cavity is recessed from the axial end face of the stator core in the axial direction and a bottom surface of the cavity contacts the enlarged diameter part of the bolt.

14. A rotary electric machine, comprising:
   a housing having a cylindrical wall in which a bolt hole is formed in an axial direction inside an inner periphery of the wall, the housing having a step on the inner periphery at an axial end side;
   a stator core fit in the housing in contact with the inner periphery of the wall, an outer peripheral part of a first axial end of the stator core being in contact with the step of the housing; and
   a bolt having an enlarged head part and a shaft part, wherein
   the enlarged head part presses an outer peripheral part of a second axial end of the stator core in the axial direction,
   the stator core has a cavity on the outer peripheral part of the second axial end of the stator core to receive the enlarged head part therein, and
   the shaft part of the bolt is substantially entirely enclosed in the bolt hole of the housing.

15. The rotary electric machine as in claim 14, wherein the cavity is formed only at a location where the enlarged head part of the bolt contacts the stator core.

16. The rotary electric machine according to claim 14, wherein the cavity is formed only on the second axial end of the stator core.

17. The rotary electric machine according to claim 14, wherein the cavity is formed such that only the enlarged head part of the bolt is received therein.

18. The rotary electric machine according to claim 14, wherein the cavity is recessed from the second axial end face of the stator core in the axial direction and a bottom surface of the cavity contacts the enlarged head part of the bolt.

19. The rotary electric machine according to claim 14, wherein an axial length of the threaded part and body part of the bolt is shorter than an axial length of the stator core.

20. A rotary electric machine, comprising:
   a housing having a cylindrical wall in which a bolt hole is formed in an axial direction inside an inner periphery of the wall, the housing having a step on the inner periphery at an axial end side;
   a stator core fit in the housing in contact with the inner periphery of the wall, an outer peripheral part of one axial end of the stator core being in direct-contact with the step of the housing;
   a bolt threaded into the bolt hole and having an enlarged head part which presses an outer peripheral part of another axial end of the stator core in the axial direction; and
   an intermediate member interposed between the enlarged part of the bolt and the outer peripheral part of the another axial end of the stator core, the intermediate member being deformable by being pressed with the enlarged head part in the axial direction and the intermediate member is deformed in a depressed manner by reducing an axial height of the intermediate member at the contact portion and keeping an axial height at a portion other than the contact portion.

21. A rotary electric machine, comprising:
   a housing having a cylindrical wall in which a bolt hole is formed in an axial direction inside an inner periphery of the wall;
   a stator core disposed in the inner periphery of the wall, the stator core having a first axial end and a second axial end;
   a bolt having an enlarged diameter part which reaches a radially outermost part of the first axial end of the stator core; and
   an intermediate member attached to the radially outermost part of the first axial end of the stator core, the intermediate member being softer than the enlarged diameter part, wherein the bolt is threaded in the bolt hole such that the enlarged diameter part presses the first axial end of the stator core in the axial direction through the intermediate member and the second axial end is in contact with the wall at an axial end side and the intermediate member is deformed in a depressed manner by reducing an axial height of the intermediate member at the contact portion and keeping an axial height at a portion other than the contact portion.

22. The rotary electric machine according to claim 21, wherein the housing has a step on the inner periphery at the axial end side, and an outer peripheral part of the second axial end of the stator core is in contact with the step.

23. A rotary electric machine, comprising:
   a housing;
   a stator core disposed in the housing; and
   a bolt having an enlarged diameter part for fixing the stator core to the housing by pressing one axial end portion of the stator core by the enlarged diameter part, wherein the stator core has a cavity at a radially outermost axial end portion of the stator core, and the enlarged diameter part contacts the stator core in the cavity and the bolt is disposed on the housing located radially outside of the stator core, wherein the housing further comprises:
   a cylindrical portion accommodating the stator core;
   a bolt hole for receiving the bolt formed on the cylindrical portion of the housing, the bolt hole having a threaded portion that is shorter than an axial length of the stator core and is located within a radial outside area of the stator core;
   a bearing box in which a bearing is supported; and
   a radial support rib extending in a radial direction to connect the bearing box and the cylindrical portion, wherein
   the bolt hole is formed on a portion of the housing where the radial support rib is connected,
   the cavity is provided only at the radially outermost axial end portion of the stator core; and the cavity is open in a radially and axially outside direction of the stator core to provide a bottom wall facing in the axially outside direction of the stator core, and the enlarged diameter part of the bolt applies a pressing force to the bottom wall when contacting the bottom wall.

24. The rotary electric machine as in claim 23, wherein the cylindrical portion has a thick portion having a radial thickness thicker than another portion of the cylindrical portion, the radial support rib is connected with the thick portion, and the bolt hole is formed on the thick portion.

25. A rotary electric machine, comprising:

a housing;

a stator core disposed in the housing;

a bolt having an enlarged diameter part for fixing the stator core to the housing by pressing one axial end portion of the stator core by the enlarged diameter part; and an intermediate member provided at a contact portion between the enlarged diameter part of the bolt and the axial end portion of the stator core, the intermediate member being softer than the enlarged diameter part of the bolt, wherein the enlarged diameter part of the bolt cuts into the intermediate member by an axial force so that the intermediate member is deformed at a contact portion with the enlarged diameter part of the bolt.

* * * * *